(12) United States Patent
Parks et al.

(10) Patent No.: US 8,001,764 B2
(45) Date of Patent: Aug. 23, 2011

(54) VIBRATION ISOLATION ENGINE MOUNT SYSTEM AND METHOD FOR DUCTED FANS

(75) Inventors: Robert Parks, San Jose, CA (US); Jean-Charles Ledé, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 1734 days.

(21) Appl. No.: 11/228,336

(22) Filed: Sep. 19, 2005

(65) Prior Publication Data
US 2006/0248873 A1    Nov. 9, 2006

Related U.S. Application Data

(60) Provisional application No. 60/610,549, filed on Sep. 17, 2004.

(51) Int. Cl.
*F02K 3/00*    (2006.01)
(52) U.S. Cl. .............. 60/269; 244/54; 248/554
(58) Field of Classification Search .............. 60/269, 60/226.1, 796; 244/12.1, 23 A–23 D, 54; 417/363; 248/554–557, 562, 603–607, 614, 248/638
See application file for complete search history.

(56) References Cited

U.S. PATENT DOCUMENTS

| | | | |
|---|---|---|---|
| 1,918,426 A | 7/1933 | Radnor | |
| 2,058,678 A | 10/1936 | Fry | |
| 2,330,622 A | 3/1940 | Ramshorn | |
| 2,328,786 A | 9/1943 | Crowder | |
| 2,338,751 A | 1/1944 | Zuck | |
| 2,347,230 A | 4/1944 | Zuck | |
| 2,365,421 A * | 12/1944 | Lord | 248/556 |
| 2,395,143 A * | 2/1946 | Prewitt | 244/17.27 |
| 2,397,632 A | 4/1946 | Stuart | |
| 2,410,967 A | 11/1946 | Eaton | |
| 2,417,725 A | 3/1947 | Zuck | |
| 2,593,541 A | 4/1948 | Cowdrey et al. | |
| 2,444,781 A | 7/1948 | Leonard | |
| 2,575,415 A | 10/1948 | Grimac | |
| 2,670,050 A | 3/1949 | Enos | |
| D153,331 S | 4/1949 | Zuck | |
| D154,829 S | 4/1949 | Zuck | |
| 2,477,637 A | 8/1949 | Mercier | |
| 2,479,125 A | 8/1949 | Leonard | |
| 2,622,826 A | 12/1952 | Prince | |
| 2,712,420 A | 7/1955 | Amster et al. | |
| 2,848,180 A | 8/1958 | Ploger | |

(Continued)

OTHER PUBLICATIONS

International Search Report & Written Opinion dated Nov. 19, 2007, issued in PCT/US05/33235 (10 pages).

(Continued)

*Primary Examiner* — Michael Cuff
*Assistant Examiner* — Phutthiwat Wongwian
(74) *Attorney, Agent, or Firm* — Katten Muchin Rosenman LLP

(57) ABSTRACT

A vibration isolation engine mount system and method for ducted fan aircraft, such as ducted fan vertical takeoff and landing (VTOL) aircraft, includes an engine for driving the ducted fan. The system includes an engine support structure for supporting the engine within the ducted fan. A rotor of the ducted fan is coupled to an engine shaft of the engine via a rotor hub. The system includes a plurality of vibration isolators configured to mount the engine to the engine support structure. Each of the plurality of vibration isolators is substantially concentrically oriented along a surface of a sphere. A center of the sphere is located at a center of the rotor hub.

8 Claims, 6 Drawing Sheets

U.S. PATENT DOCUMENTS

| | | |
|---|---|---|
| 2,866,608 A | 12/1958 | Leonard |
| 2,908,472 A | 10/1959 | McDonald |
| 2,959,373 A | 11/1960 | Zuck |
| 2,994,493 A | 8/1961 | Hartman |
| 3,056,564 A | 10/1962 | Zuck |
| 3,096,952 A | 7/1963 | Roppel |
| 3,100,377 A | 8/1963 | Kosin et al. |
| 3,138,351 A | 6/1964 | Zuck |
| 3,142,455 A | 7/1964 | Wilford |
| 3,164,222 A | 1/1965 | Conrad |
| 3,166,271 A | 1/1965 | Zuck |
| 3,169,728 A | 2/1965 | Langfelder et al. |
| 3,175,789 A | 3/1965 | Blumrich |
| 3,179,353 A | 4/1965 | Peterson |
| 3,258,206 A | 6/1966 | Simonson |
| 3,350,035 A | 10/1967 | Schlieben |
| 3,387,805 A | 6/1968 | Barnett et al. |
| 3,415,469 A | 12/1968 | Spratt |
| 3,475,913 A | 11/1969 | Mortlock et al. |
| 3,511,455 A | 5/1970 | Weick |
| 3,563,496 A | 2/1971 | Zuck |
| 3,664,463 A | 5/1972 | Kuethe |
| 3,730,459 A | 5/1973 | Zuck |
| 3,806,068 A | 4/1974 | Blythe et al. |
| 3,987,981 A | 10/1976 | Kook |
| 4,005,835 A | 2/1977 | Gerstine et al. |
| 4,037,405 A | 7/1977 | Huenniger et al. |
| 4,045,948 A | 9/1977 | Hannibal |
| 4,071,207 A | 1/1978 | Piasecki et al. |
| 4,092,716 A | 5/1978 | Berg et al. |
| 4,124,180 A | 11/1978 | Wolowicz |
| 4,155,221 A | 5/1979 | Dhoore et al. |
| 4,175,385 A | 11/1979 | Nash |
| 4,214,703 A | 7/1980 | Sorensen et al. |
| 4,241,876 A | 12/1980 | Pedersen |
| 4,250,658 A | 2/1981 | Kress |
| 4,358,074 A | 11/1982 | Schoen et al. |
| 4,415,132 A | 11/1983 | Shirk |
| 4,474,534 A | 10/1984 | Thode |
| 4,519,559 A | 5/1985 | Logan et al. |
| 4,568,043 A | 2/1986 | Schmittle |
| 4,575,006 A | 3/1986 | Madden |
| 4,596,368 A | 6/1986 | Schmittle |
| 4,630,788 A | 12/1986 | Veaux et al. |
| 4,634,081 A | 1/1987 | Chee |
| 4,709,879 A | 12/1987 | Stafford |
| 4,804,155 A | 2/1989 | Strumbos |
| 4,805,868 A * | 2/1989 | Claude ................ 248/603 |
| 4,821,980 A | 4/1989 | Clausen et al. |
| 4,875,655 A | 10/1989 | Bender et al. |
| 4,928,907 A | 5/1990 | Zuck |
| 4,948,072 A | 8/1990 | Garland et al. |
| 4,964,599 A | 10/1990 | Farineau |
| 4,967,984 A | 11/1990 | Allen |
| 4,978,071 A | 12/1990 | MacLean et al. |
| 5,000,404 A | 3/1991 | Martorella |
| 5,028,001 A | 7/1991 | Bender et al. |
| 5,056,738 A | 10/1991 | Mercer et al. |
| 5,062,587 A | 11/1991 | Wernicke |
| 5,067,668 A | 11/1991 | Zuck |
| 5,086,993 A | 2/1992 | Wainfan |
| 5,115,996 A | 5/1992 | Moller |
| 5,116,030 A | 5/1992 | Nowak et al. |
| 5,176,339 A | 1/1993 | Schmidt |
| 5,280,863 A | 1/1994 | Schmittle |
| 5,282,358 A | 2/1994 | Schilling |
| 5,289,994 A | 3/1994 | Del Campo Aguilera |
| 5,294,077 A | 3/1994 | Derrien |
| 5,295,643 A | 3/1994 | Ebbert et al. |
| 5,340,057 A | 8/1994 | Schmittle |
| 5,366,180 A | 11/1994 | Wainfan et al. |
| 5,366,181 A | 11/1994 | Hanson |
| 5,390,877 A | 2/1995 | Nightingale |
| 5,395,073 A | 3/1995 | Rutan et al. |
| 5,509,623 A | 4/1996 | Schmittle |
| 5,516,060 A | 5/1996 | McDonnell |
| 5,524,847 A | 6/1996 | Brodell et al. |
| 5,560,568 A | 10/1996 | Schmittle |
| 5,666,803 A | 9/1997 | Windisch |
| 5,687,948 A | 11/1997 | Whiteford et al. |
| 5,746,390 A | 5/1998 | Chiapetta |
| 5,765,777 A | 6/1998 | Schmittle |
| 5,765,783 A | 6/1998 | Albion |
| 5,769,359 A | 6/1998 | Rutan et al. |
| 5,842,687 A | 12/1998 | David |
| 5,941,478 A | 8/1999 | Schmittle |
| RE36,487 E | 1/2000 | Wainfan |
| 6,168,117 B1 | 1/2001 | Shinagawa |
| 6,170,778 B1 | 1/2001 | Cycon et al. |
| 6,293,141 B1 | 9/2001 | Nance |
| 6,318,668 B1 | 11/2001 | Ulanoski et al. |
| 6,328,259 B1 | 12/2001 | Bolukbasi |
| 6,336,610 B1 | 1/2002 | Wode |
| 6,343,768 B1 | 2/2002 | Muldoon |
| 6,358,014 B1 | 3/2002 | Chou et al. |
| 6,364,603 B1 | 4/2002 | Czahor et al. |
| 6,382,556 B1 | 5/2002 | Pham |
| 6,382,559 B1 | 5/2002 | Sutterfield et al. |
| 6,471,198 B2 | 10/2002 | Herbst |
| 6,474,603 B1 | 11/2002 | Kinkead et al. |
| 6,539,290 B1 | 3/2003 | Vos |
| 6,543,718 B2 | 4/2003 | Provost |
| 6,547,180 B1 | 4/2003 | Cassidy |
| 6,561,455 B2 | 5/2003 | Capanna |
| 6,568,635 B2 | 5/2003 | Carpenter |
| 6,592,071 B2 | 7/2003 | Kinkead et al. |
| 6,708,920 B2 * | 3/2004 | Fukuyama ................ 244/12.4 |
| 6,751,946 B2 | 6/2004 | Li |
| 6,783,096 B2 | 8/2004 | Baldwin |
| 6,808,140 B2 | 10/2004 | Moller |
| 2003/0127569 A1 | 7/2003 | Bacon et al. |
| 2003/0141418 A1 | 7/2003 | Darbyshire |
| 2004/0026563 A1 | 2/2004 | Moller |

OTHER PUBLICATIONS

NASA, Pitot-Static Tube, http://www.grc.nasa.gov/WWW/K-12/airplane/pitot.html.

http://en.wikipedia.org/wiki/Moment_of_inertia; available on the web Feb. 19, 2008; 8 pages.

Notification of Transmittal of the International Search Report and the Written Opinion of the International Searching Authority or Declaration for International Application No. PCT/US05/33232; mailed Apr. 17, 2008; 8 pages.

Dr. Edward T. Smith; "Near-Term Demonstrations of GoldenEye-50 UAV with Options for Advanced Features"; Aurora Flight Sciences Corp.; Jun. 30, 2004; 5 pages.

"GoldenEye-50: A Proposal to Lockheed Martin; Aurora Proposal No. AP04-026"; Aurora Flight Sciences Corp.; Jun. 4, 2004; 12 pages.

Greg Slabodkin; "GoldenEye-100 UAV Successfully Completes Initial Flight Test Program"; Aurora Flight Sciences Corp. Press Release, APR-153; Apr. 7, 2004, 1 page, www.aurora.aero.

Dr. Edward T. Smith; "Feb. 12, 2004 Demonstration Summary: Reference to Proposal No. AP04-018"; Aurora Flight Sciences Corp.; Feb. 23, 2004; 5 pages.

"DARPA Heterogeneous Urban RSTA Team (HURT) Program: A Proposal in Response to Raytheon RFP REB012404.01; Aurora Proposal No. AP04-014"; Aurora Flight Sciences Corp.; Feb. 6, 2004; 19 pages.

"An Advanced Low-Observable UAV System for Remote Sensor Deployment: Aurora Proposal No. AP04-001"; Aurora Flight Sciences Corp.; Jan. 15, 2004; 21 pages.

Greg Slabodkin; "Aurora Announces Plans for GoldenEye-50 Unmanned Aerial Vehicle: VTOL Design Provides Versatile Tool for Homeland Security Applications"; Aurora Flight Sciences Corp. Press Release, APR-150; Dec. 4, 2003; 2 pages; www.aurora.aero.

"2nd AIAA Unmanned Unlimited Systems, Technologies, and Operations—Aerospace, Land, and Sea Conference and Workshop & Exhibit: Event Agenda"; AIAA—American Institute of Aeronautics and Astronautics; Sep. 16, 2003; 6 pages; http://www.aiaa.org/agenda.cfm?lumeetingid=834&viewcon=agenda&pageview=2&programSeeview=1&dateget=16-Sep-03.html.

Carl G. Schaefer, Jr., et al.; "GoldenEye: The Clandestine UAV"; American Institute of Aeronautics and Astronautics; Sep. 16, 2003; 11 pages.

Dr. Edward T. White; "Golden Eye's First Flight Successful: Aurora Demonstrates Potential for a New Breed of Unmanned Aircraft"; Aurora Flight Sciences Corp. Press Release, APR-148; Sep. 8, 2003, 8 pages (with photos downloaded from website); http://aurora_aero/news/apr-148.html.

Jim Garamone; "UAVs Demonstrate the Future at Pax River Event"; American Forces Information Service News Articles, United States Department of Defense; Jul. 14, 2003; 7 pages (with photos downloaded from website); http://www.defenselink.mil/news/Jul2003/n07142003_200307144.html.

"GoldenEye-50 System Information Sheet"; Aurora Flight Sciences Corp.; Jul. 2003; 2 pages.

http://en.wikipedia.org/wiki/Attitude_indicator; available on the web Jul. 30, 2004; 1 page.

http://www.tpub.com/content /aviation/14030/css/14030_205.htm; available on the web Sep. 26, 2003; 1 page.

http://www.grc.nasa.gov/WWW/K-12/airplane/pitot.html; available on the web May 22, 2000; 3 pages.

Notification of Transmittal of the International Search Report and the Written Opinion, the International Search Report, and the Written Opinion for International Application No. PCT/US05/33233; mailed Dec. 14, 2006; 12 pages.

"Freewing Scorpion UAV", http://www.scaled.com/projects/freewing.html; Nov. 16, 2006; 2 pages.

http://en.wikipedia.org/wiki/Inertial_measurement_unit; available on the web Nov. 27, 2002; 2 pages.

GoldenEye-50 Transition Images. Aurora Flight Sciences. http://www.aurora.aero/GE50/images/GE-transition.jpg; Nov. 28, 2006; 2 pages.

"GoldenEye's First Flight Successful." Aurora Flight Sciences Press Release, Jul. 16, 2003, with linked images. http://www.aurora.aero/news/APR-148.html; 9 pages.

GoldenEye-50 Transition Images. Apr. 26, 2005; further depicts GoldenEye-50 as disclosed in Garamone; http://www.aurora.aero/GE50/images/GE-transition.jpg; ; 2 pages.

Notification of Transmittal of the International Search Report and the Written Opinion, the International Search Report, and the Written Opinion for International Application No. PCT/US05/33000; mailed Jun. 28, 2007; 15 pages.

"International Preliminary Report on Patentability"; PCT/US2005/033000; Jul. 26, 2007; 12 Pages.

Chuck Wilkins; "Team GoldenEye Selected for Phase II of DARPA OAV-II Program"; Aurora Flight Sciences Corp. Press release, APR-165; Jul. 13, 2004; 1 Page.

Chuck Wilkins; "Team GoldenEye to Develop Organic Air Vehicle for DARPA"; Aurora Flight Sciences Press Release, APR-158; Dec. 7, 2004; 2 Pages.

T. M. Harris et al.; "Theoretical Investigation of Torsion Free Wing Flutter Models"; Air Force Flight Dynamics Laboratory Director of Science & Technology Air Force Systems Command; AFFDL-TM-76-93-FBR; Aug. 1976; 72 Pages.

W. M. Moseley, Jr. et al.; "Stress and Weight Analysis of a Torsionally Free Wing System"; General Dynamics-Convair Aerospace Division; ERR-FW-1446; Jul. 15, 1973; 57 Pages.

W. J. Moran; "ATF/TFW Feasibility Study—Performance Analyses"; General Dynamics-Convair Aerospace Division; ERR-FW-1459; Dec. 31, 1973; 19 Pages.

I. C. Bhateley; "An Investigation of the Interference Effects Between Fuselage and Wing at High Relative Incidence"; General Dynamics-Convair Aerospace Division; ERR-FW-1464; Dec. 31, 1973; 70 Pages.

G. T. Joyce; "The Stability and Control Characteristics of a Torsion Free Wing Advanced Tactical Fighter"; General Dynamics-Convair Aerospace Division; ERR-FW-1451; Dec. 31, 1973; 50 Pages.

Notification of Transmittal of the International Search Report and the Written Opinion, the International Search Report, and the Written Opinion for International Application No. PCT/US05/33231; mailed Aug. 8, 2007; 8 pages.

Athena Controls; GuideStar 111m; http://www.athenati.com/products_services/services/guidestar_gs-111m, 2 pages.

Athena Controls; GuideStar Flies on GoldenEye-50, Apr. 26, 2005; 1 Page; http://www.athenati.com/news/press_releases/april_26_2005.

"International Preliminary Report on Patentability"; PCT/US2005/033231; Sep. 20, 2007; 2 Pages.

* cited by examiner

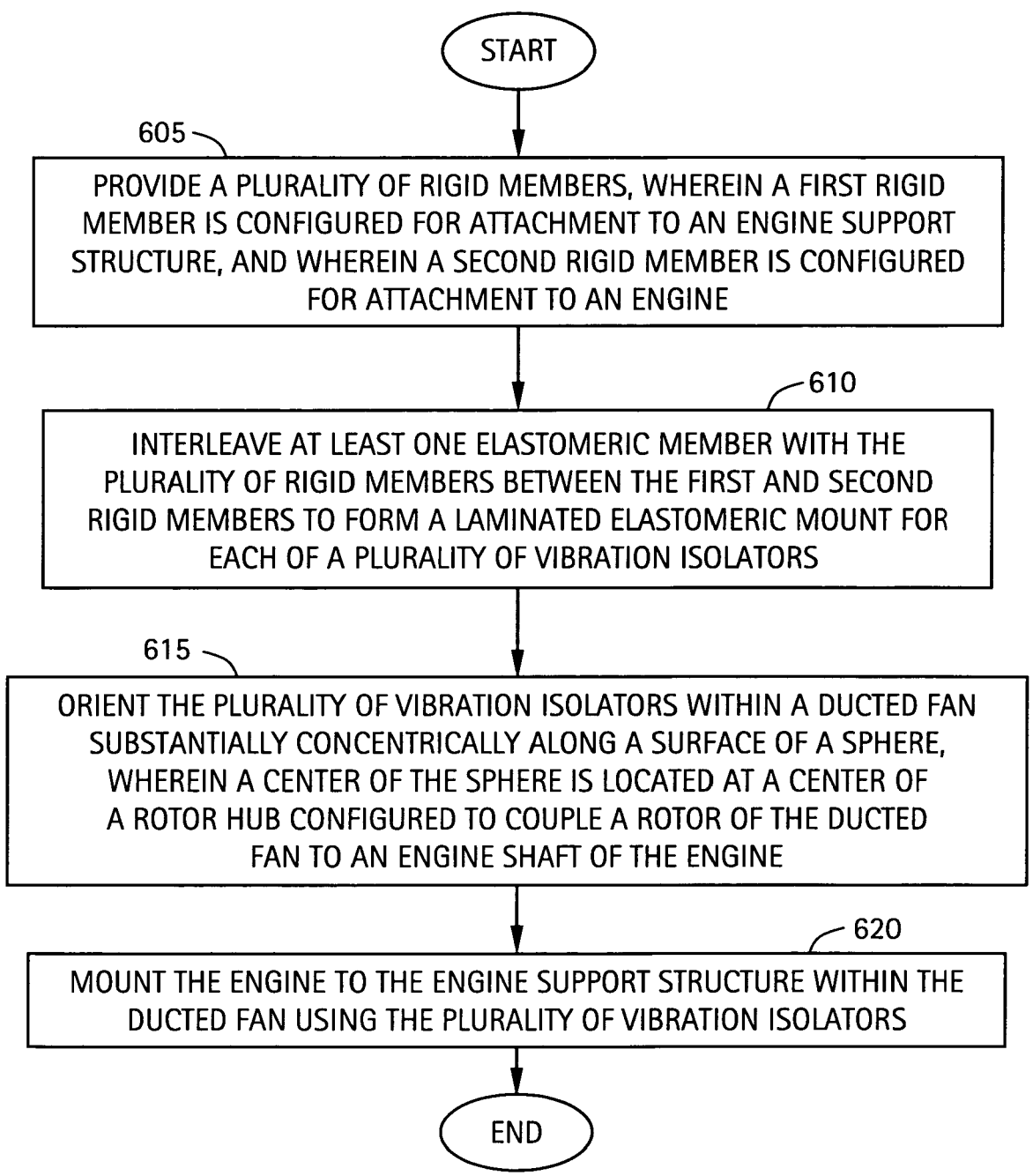

VIBRATION ISOLATION ENGINE MOUNT SYSTEM AND METHOD FOR DUCTED FANS

This application claims priority under 35 U.S.C. §119(e) to U.S. Provisional Application No. 60/610,549, filed on Sep. 17, 2004, the entire contents of which are hereby incorporated by reference herein.

BACKGROUND

1. Field of the Invention

The present invention relates to ducted fans. More particularly, the present invention relates to a vibration isolation engine mount system and method for ducted fan aircraft.

2. Background Information

For high aerodynamic performance, cooling or propulsion fans are often mounted in ducts, such as in, for example, vertical takeoff and landing (VTOL) aircraft and the like, referred to as ducted fan aircraft. For best results in performance, a very small gap should exist between the fan blade tips and the inside of the duct. However, many ducted fans are driven by engines with substantial vibration. Consequently, there is a large gap between the blade tips of the ducted fan and the interior of the duct to allow for the motion resulting from the vibration.

Therefore, there is a need to provide isolation of the engine vibration from the rest of the aircraft system that can allow large engine motion at certain RPMs, while still maintaining a desirable small clearance between the blade tips of the ducted fan and the duct.

SUMMARY OF THE INVENTION

A vibration isolation engine mount system and method for ducted fan aircraft, such as ducted fan vertical takeoff and landing (VTOL) aircraft, is disclosed. In accordance with exemplary embodiments of the present invention, according to a first aspect of the present invention, a vibration isolation system for a ducted fan having an engine for driving the ducted fan includes an engine support structure for supporting the engine within the ducted fan. A rotor of the ducted fan is coupled to an engine shaft of the engine via a rotor hub. The system includes a plurality of vibration isolators configured to mount the engine to the engine support structure. Each of the plurality of vibration isolators is substantially concentrically oriented along a surface of a sphere. A center of the sphere is located at a center of the rotor hub.

According to the first aspect, the engine support structure can comprise stators. The engine support structure can be located aft of the engine. The plurality of vibration isolators can include at least three vibration isolators. Each of the plurality of vibration isolators can comprise a laminated elastomeric mount. Each of the plurality of vibration isolators can include a plurality of rigid members. The plurality of rigid members can include a first rigid member and a second rigid member. The first rigid member can be configured for attachment to the engine support structure. The second rigid member can be configured for attachment to the engine. Each of the plurality of vibration isolators can also include at least one elastomeric member interleaved with the plurality of rigid members between the first and second rigid members to form a laminated elastomeric mount. A gap distance between a tip of the rotor and a wall of the ducted fan can be small. According to an exemplary embodiment of the first aspect, the rotor can be located fore of the engine. According to an alternative exemplary embodiment of the first aspect, the rotor is located aft of the engine.

According to a second aspect of the present invention, a vibration isolation system for a ducted fan having a means for driving the ducted fan includes means for supporting the driving means within the ducted fan. A rotating means for propulsion of the ducted fan is coupled to a shaft of the driving means via a means for connecting. The system includes a plurality of means for isolating vibration configured to mount the driving means to the supporting means. Each of the plurality of vibration isolating means is substantially concentrically oriented along a surface of a sphere. A center of the sphere is located at a center of the connecting means.

According to the second aspect, the supporting means can comprise stator means. The supporting means can be located aft of the driving means. The plurality of vibration isolating means can comprise at least three vibration isolating means. Each of the plurality of vibration isolating means can comprise a laminated elastomeric means for mounting. Each of the plurality of vibration isolating means can include a plurality of rigid member means. The plurality of rigid member means can include a first rigid member means and a second rigid member means. The first rigid member means can be configured for attachment to the supporting means. The second rigid member means can be configured for attachment to the driving means. Each of the plurality of vibration isolating means can also include a plurality of elastomeric member means interleaved with the plurality of rigid member means between the first and second rigid member means to form a laminated elastomeric means for mounting. A gap distance between a tip of the rotating means and a wall of the ducted fan can be small. According to an exemplary embodiment of the second aspect, the rotating means can be located fore of the driving means. According to an alternative exemplary embodiment of the second aspect, the rotating means can be located aft of the driving means.

According to a third aspect of the present invention, a method for isolating vibration in a ducted fan having an engine for driving the ducted fan includes the steps of: a.) orienting a plurality of vibration isolators within the ducted fan substantially concentrically along a surface of a sphere, wherein a center of the sphere is located at a center of a rotor hub configured to couple a rotor of the ducted fan to an engine shaft of the engine; and b.) mounting the engine to an engine support structure within the ducted fan using the plurality of vibration isolators.

According to the third aspect, the engine support structure can includes stators. The method can include the step of: c.) locating the engine support structure aft of the engine. The plurality of vibration isolators can include at least three vibration isolators. Each of the plurality of vibration isolators can include a laminated elastomeric mount. Step (a) can include the steps of: d.) providing a plurality of rigid members, wherein the plurality of rigid members includes a first rigid member and a second rigid member, wherein the first rigid member is configured for attachment to the engine support structure, and wherein the second rigid member is configured for attachment to the engine; and e.) interleaving at least one elastomeric member with the plurality of rigid members between the first and second rigid members to form a laminated elastomeric mount for each of the plurality of vibration isolators. A gap distance between a tip of the rotor and a wall of the ducted fan can be small. According to an exemplary embodiment of the third aspect, the rotor can be located fore of the engine. According to an alternative exemplary embodiment of the third aspect, the rotor can be located aft of the engine.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein:

FIG. 6 is a flowchart illustrating steps for isolating vibration in a ducted fan having an engine for driving the ducted fan, in accordance with an exemplary embodiment of the present invention.

DETAILED DESCRIPTION OF THE PREFERRED EMBODIMENTS

Exemplary embodiments of the present invention are directed to a vibration isolation engine mount system and method for use in ducted fans, such as, for example, a ducted fan aircraft, a vertical takeoff and landing (VTOL) ducted fan aircraft or any other suitable type of ducted fan or aircraft. According to exemplary embodiments, a fan rotor is attached to an engine shaft of an engine mounted within the duct. An assembly of structural stators is located, for example, aft of the engine. A plurality of laminated-type rubber mounts, such as, for example, three or any suitable number, are configured to mount the engine to the stator assembly. The mounts are oriented to lie on the surface of a sphere that is centered in the middle of the fan rotor hub. Such an assembly according to exemplary embodiments allows the engine to rotate about three axes centered at the point in the center of the fan where the mounts are aimed, but does not allow significant motion of the fan relative to the duct. Thus, the present invention according to exemplary embodiments allows the engine to move in directions that minimize the vibration coupled into the airplane structure, while still maintaining minimal fan-rotor-tip-to-duct clearances. Additionally, a large separation between the fan rotor and the structural stators can be maintained that can substantially reduce the aerodynamic noise.

Figure 1:
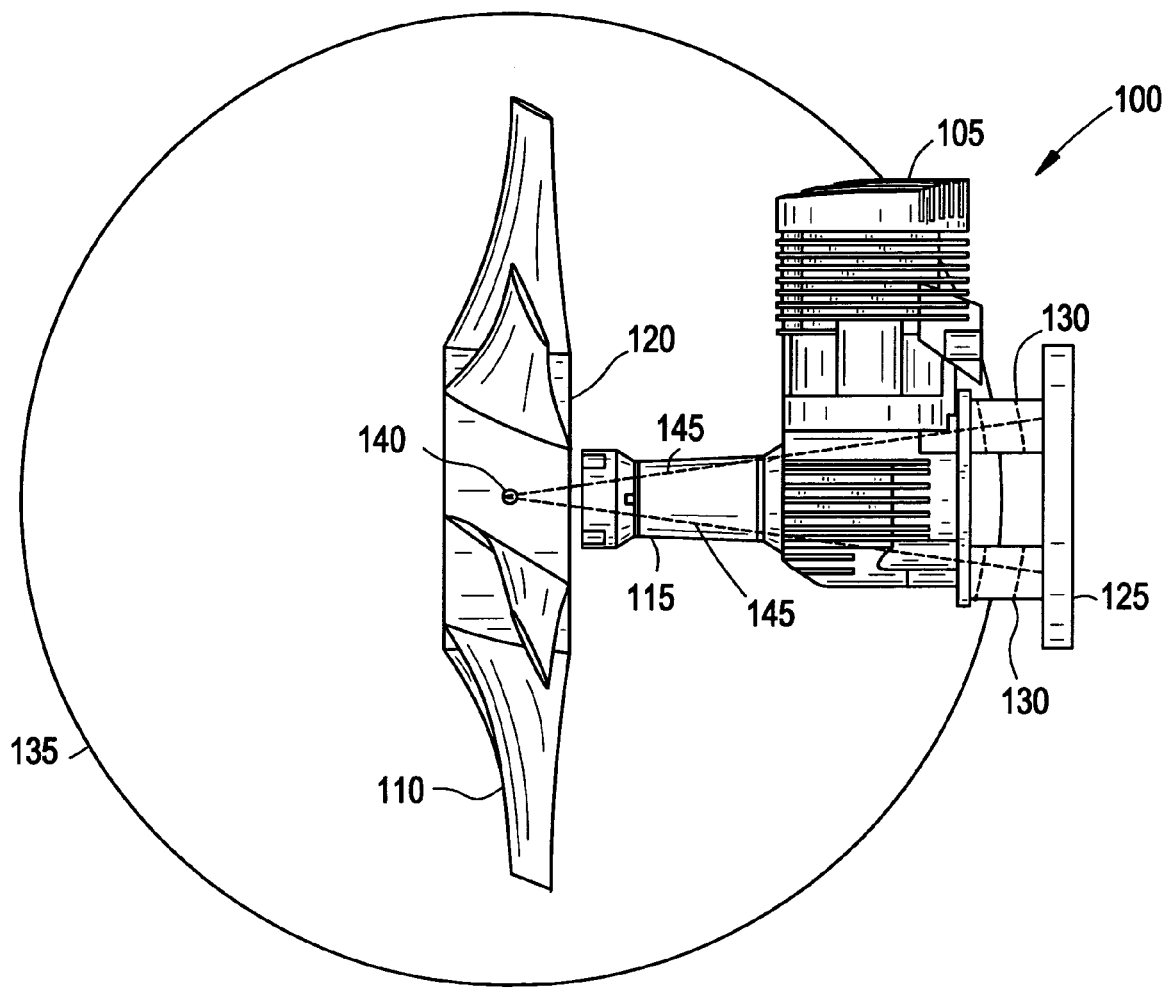
FIG. 1 is a diagram illustrating a side view of a vibration isolation engine mount system for use in an aircraft, in accordance with an exemplary embodiment of the present invention.

These and other aspects of the present invention will now be described in greater detail. FIG. 1 is a diagram illustrating a side view of a vibration isolation engine mount system 100 for use in an aircraft, in accordance with an exemplary embodiment of the present invention. Exemplary embodiments of the present invention can be used with any suitable type of ducted fan or aircraft, such as any suitable form of ducted fan aircraft, such as, for example, a ducted fan VTOL aircraft or the like. For purposes of illustration and not limitation, according to an exemplary embodiment, the system 100 includes a ducted fan including an engine 105 for driving the ducted fan. A rotor 110 of the ducted fan is coupled to an engine shaft 115 of the engine 105 via a rotor hub 120. The system 100 includes an engine support structure 125 that is configured to support the engine 105 within the ducted fan. The system 100 includes a plurality of vibration isolators 130 configured to mount the engine 105 to the engine support structure 125. Any suitable number of vibration isolators 130 can be used to mount the engine 105 to the engine support structure 125. For example, according to an exemplary embodiment, at least three vibration isolators 130 can be used.

According to exemplary embodiments, each of the plurality of vibration isolators 130 is substantially concentrically oriented along a surface of a sphere 135. The center of the sphere 135 is located at a center 140 of the rotor hub 120. As illustrated in FIG. 1, each of the vibration isolators 130 is aimed at or otherwise aligned towards the center 140 of the rotor hub 120 along radial lines 145.

Figure 2:
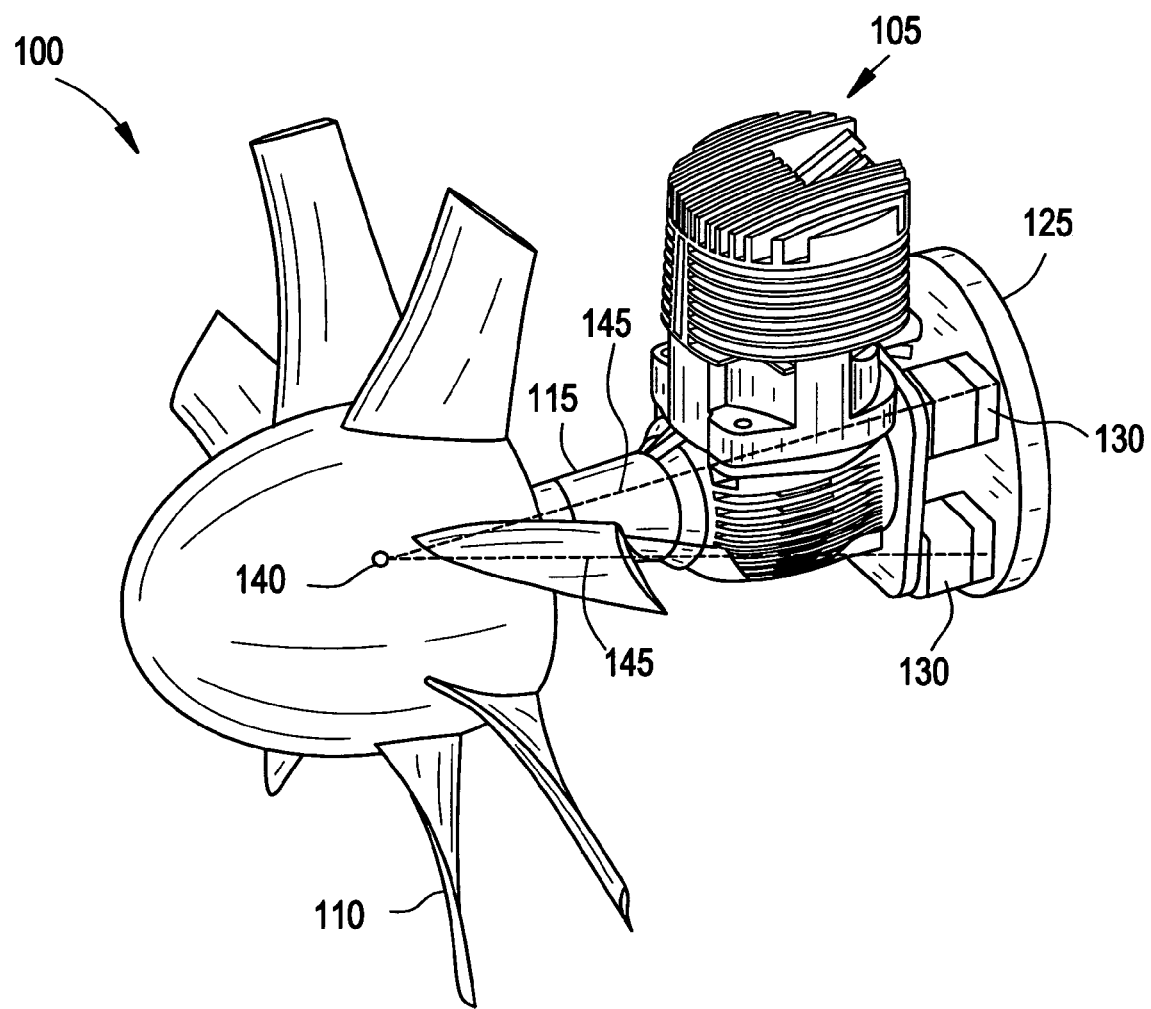
FIG. 2 is a diagram illustrating an oblique view of a vibration isolation engine mount system for use in an aircraft, in accordance with an exemplary embodiment of the present invention.

FIG. 2 is a diagram illustrating an oblique view of the vibration isolation engine mount system 100 for use in an aircraft, in accordance with an exemplary embodiment of the present invention. As illustrated in FIG. 2, the plurality of vibration isolators 130 can be located and mounted, for example, substantially circumferentially around the engine support structure 125. According to an exemplary embodiment, three vibration isolators 130 can be mounted to the engine support structure 125 to support the engine 105. However, any suitable number of vibration isolators 130 can be mounted to the engine support structure 125 at any suitable locations on the engine support structure 125 that are capable of appropriately supporting the engine 105. As discussed previously, each of the vibration isolators 130 is aimed at or otherwise aligned towards the center 140 of the rotor hub 120 along radial lines 145.

Figure 3:
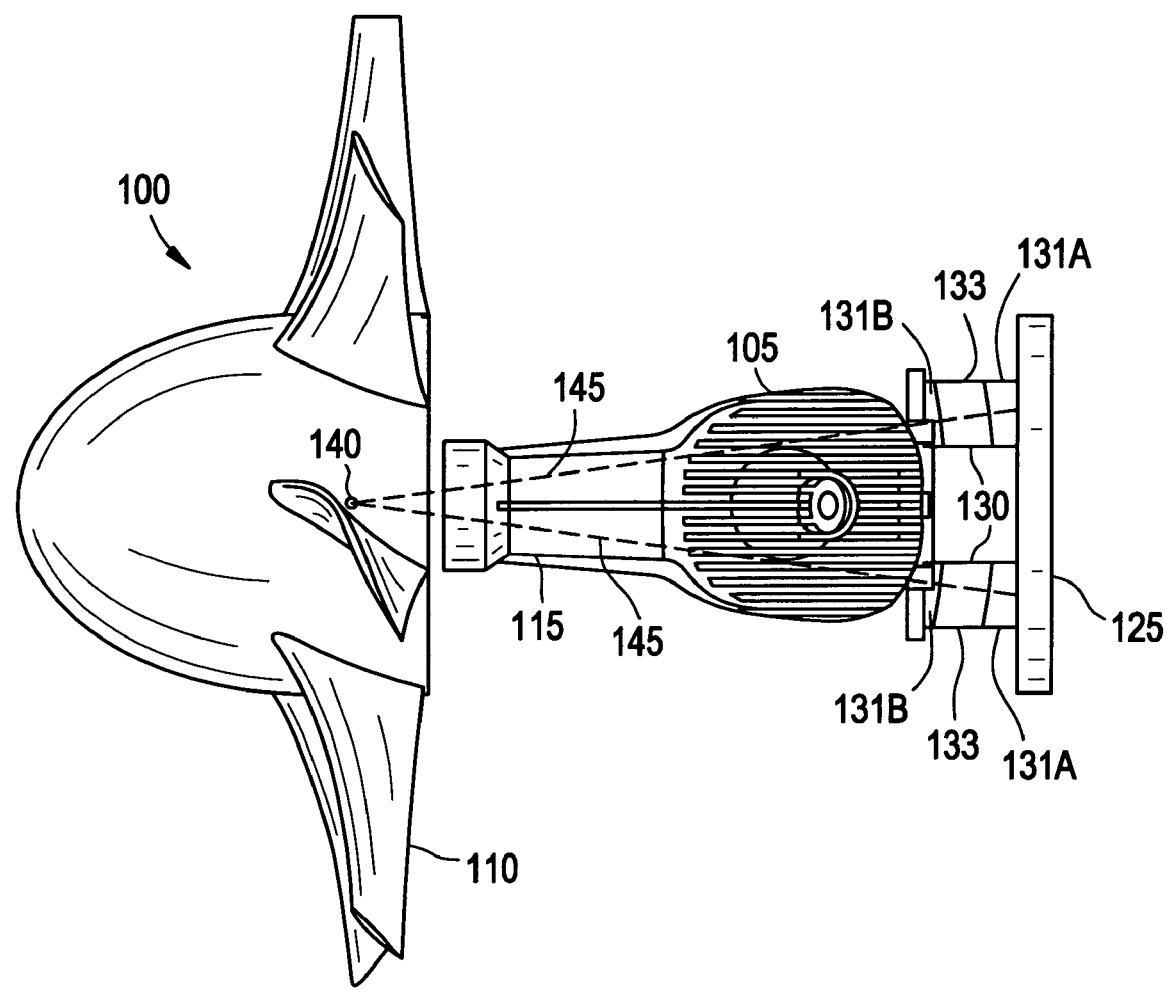
FIG. 3 is a diagram illustrating an expanded view of a vibration isolation engine mount system 100 for use in an aircraft, in accordance with an exemplary embodiment of the present invention.

According to exemplary embodiments, each of the plurality of vibration isolators 130 can comprise a laminated elastomeric mount, such as, for example, a laminated rubber-compliant mount. FIG. 3 is a diagram illustrating an expanded view of the vibration isolation engine mount system 100 for use in an aircraft, in accordance with an exemplary embodiment of the present invention. As illustrated in FIG. 3, the laminated elastomeric mounts can comprise, for example, thin layers of rubber or other like elastomeric material laminated or otherwise bonded between thin sheets of metal or other like material. According to exemplary embodiments, each of the plurality of vibration isolators 130 includes a plurality of rigid members 131. For example, the plurality of rigid members 131 can include a first rigid member 131A and a second rigid member 131B. The first rigid member 131A (e.g., an "outer" rigid member) is configured for attachment to the engine support structure 125. The second rigid member 131B (e.g., an "inner" rigid member) is configured for attachment to the engine 105. Each of the plurality of vibration isolators 130 includes one or more elastomeric members 133 interleaved with the plurality of rigid members 131 between the first and second rigid members 131A and 131B to form each laminated elastomeric mount. Any suitable number of layers of rigid members 131 and elastomeric members 133 can be interleaved to form the laminated elastomeric mounts. The rigid layers 131 can be bonded to the elastomeric members 133 using any suitable form of bonding agent or bonding means, such as, for example, adhesive, screws, bolts, or the like.

The laminated elastomeric mounts can be substantially flat, planar sheets, although the mounts can be substantially cylindrical, spherical or other suitable shape or configuration. Each laminated elastomeric mount is substantially compliant in shear in the plane of the mounts (e.g., perpendicular to the spin axis of the rotor 110), but substantially stiff perpendicular to the plane of the mounts (e.g., parallel to the spin axis of the rotor 110). According to an exemplary embodiment, each laminated elastomeric mount can comprise, for example, a DYNAFOCAL™ engine mount manufactured by the LORD Corporation of Cary, N.C.

Figure 4:
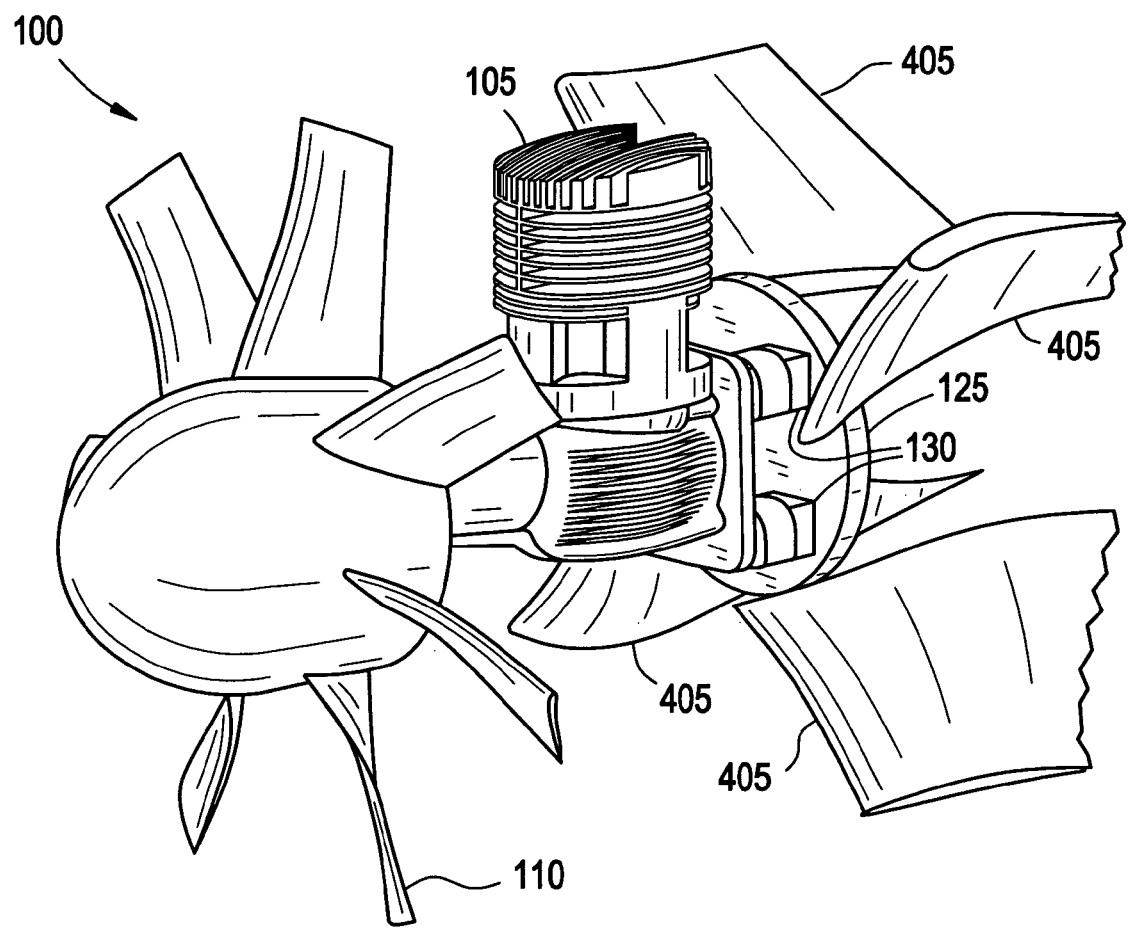
FIG. 4 is a diagram illustrating an alternative view of a vibration isolation engine mount system for use in an aircraft, in accordance with an exemplary embodiment of the present invention.

FIG. 4 is a diagram illustrating an alternative view of the vibration isolation engine mount system 100 for use in an aircraft, in accordance with an exemplary embodiment of the present invention. The engine support structure 125 can include a plurality of struts or stators 405. The stators 405 can be configured to attach or otherwise mount the engine support structure 125 to the interior of the duct of the ducted fan. Any suitable number of stators 405 can be used to mount the engine support structure 125.

Figure 5:
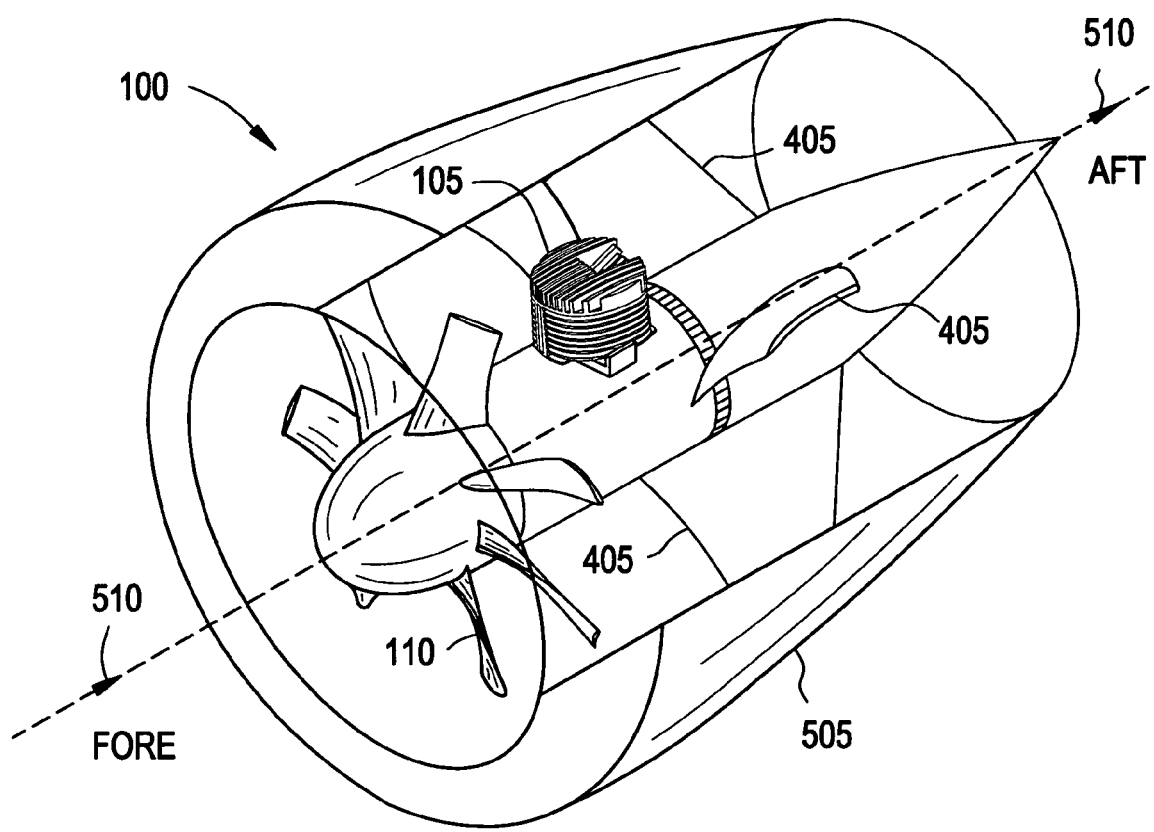
FIG. 5 is a diagram illustrating a vibration isolation engine mount system mounted within a duct, in accordance with an exemplary embodiment of the present invention.

FIG. 5 is a diagram illustrating the vibration isolation engine mount system 100 mounted within a duct 505, in accordance with an exemplary embodiment of the present invention. As illustrated in FIG. 5, the plurality of stators 405 are configured to attach or otherwise mount the engine 105 and rotor 110 to the interior of the duct 505 via the engine support structure 125. However, alternative arrangements and configurations of the components of the system 100 can be used. For example, as illustrated in FIGS. 1-5, the rotor 110 is located fore of the engine 105, and the engine support structure 125 is located aft of the engine 105, relative to the duct 505 and the direction of airflow 510 through the duct 505. However, according to an alternative exemplary embodiment, the rotor 110 can be located aft of the engine 105, and the engine support structure 125 can be located fore of the engine 105, relative to the duct 505 and the direction of airflow 510 through the duct 505. According to either exemplary embodiment, the gap distance between the tip of the rotor 110 and the interior wall of the duct 505 of the ducted fan can be substantially small or otherwise narrow, as exemplary embodiments can prevent substantial motion of the fan relative to the duct 505. In other words, rotation of the engine assembly is substantially constrained about axes that are substantially perpendicular to the spin axis of the rotor 110. Thus, the engine motion can be constrained to translation on axes perpendicular to the spin axis of the rotor 110 and torque rotation about that axis.

According to exemplary embodiments, the engine 105 can be any suitable type of engine capable of driving a ducted fan and/or moving the aircraft, such as, for example, a ducted fan aircraft, a VTOL ducted fan aircraft or the like. The rotor 110 can be able suitable type of rotor or fan capable of moving air through the ducted fan and/or propelling the aircraft. The engine support structure 125 can be comprised of any suitable type of material capable of supporting the engine 105 and rotor 110 within the duct of the aircraft, such as metal or steel or any other suitable type of alloy or composite material. The stators 405 can comprise any suitable type of material capable of mounting the engine support structure 125 within the duct 505 and capable of supporting the engine 105, rotor 110, and engine support structure 125 within the duct, such as, for example, metal or steel or any other suitable type of alloy or composite material.

FIG. 6 is a flowchart illustrating steps for isolating vibration in a ducted fan having an engine for driving the ducted fan, in accordance with an exemplary embodiment of the present invention. In step 605, a plurality of rigid members is provided. The plurality of rigid members includes a first rigid member and a second rigid member. The first rigid member is configured for attachment to the engine support structure. The second rigid member is configured for attachment to the engine. In step 610, at least one elastomeric member is interleaved with the plurality of rigid members between the first and second rigid members to form a laminated elastomeric mount for each of the plurality of vibration isolators. In step 615, the plurality of vibration isolators are oriented within the ducted fan substantially concentrically along a surface of a sphere. The center of the sphere is located at the center of the rotor hub configured to couple the rotor of the ducted fan to the engine shaft of the engine. In step 620, the engine is mounted to the engine support structure within the ducted fan using the plurality of vibration isolators.

Exemplary embodiments of the present invention can be used in any suitable type of ducted fan or aircraft, such as, for example, a ducted fan aircraft, a VTOL ducted fan aircraft or the like. For example, the vibration isolation engine mount system according to exemplary embodiments can be used in a ducted fan aircraft to provide isolation of the engine vibration from the rest of the aircraft system to allow large engine motion at certain RPMs, while still maintaining a desirable small clearance between the blade tips of the rotor and the interior of the duct.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated herein by reference in their entireties.

What is claimed is:

1. A method for isolating vibration in a ducted fan having an engine for driving the ducted fan, comprising the steps of:
   a.) orienting a plurality of elastomeric vibration isolators within a fan duct, each vibration isolator being disposed substantially concentrically along a surface of a sphere, wherein a center of the sphere is located at a center of a rotor hub configured to couple a rotor of the ducted fan to an engine shaft of the engine; and
   b.) attaching the engine to the plurality of vibration isolators, mounting the plurality of vibration isolators to a plate of an engine support structure within the fan duct, wherein the engine support structure further includes stator vanes.

2. The method of claim 1, comprising the step of:
   c.) locating the engine support structure aft of the engine.

3. The method of claim 1, wherein the plurality of vibration isolators includes at least three vibration isolators.

4. The method of claim 1, wherein each of the plurality of vibration isolators includes a laminated elastomeric mount.

5. The method of claim 1, wherein step (a) comprises the steps of:
   c.) providing a plurality of rigid members,
      wherein the plurality of rigid members includes a first rigid member and a second rigid member,
      wherein the first rigid member is configured for attachment to the engine support structure, and
      wherein the second rigid member is configured for attachment to the engine; and
   d.) interleaving at least one elastomeric member with the plurality of rigid members between the first and second rigid members to form a laminated elastomeric mount for each of the plurality of vibration isolators.

6. The method of claim 1, wherein a gap distance between a tip of the rotor and a wall of the ducted fan is small.

7. The method of claim 1, wherein the rotor is located fore of the engine.

8. The method of claim 1, wherein the rotor is located aft of the engine.

* * * * *